COLOR TELEVISION SYNCHRONIZING APPARATUS

Filed Sept. 11, 1950 6 Sheets-Sheet 1

INVENTORS
ROBERT J. STAHL &
NORMAN L. HEIKES
BY
Lippincott & Smith
ATTORNEYS

May 29, 1956 R. J. STAHL ET AL 2,748,188

COLOR TELEVISION SYNCHRONIZING APPARATUS

Filed Sept. 11, 1950 6 Sheets-Sheet 2

INVENTORS
ROBERT J. STAHL &
NORMAN L. HEIKES
BY Lippincott & Smith
ATTORNEYS

INVENTORS
ROBERT J. STAHL &
NORMAN L. HEIKES
BY
Lippincott & Smith
ATTORNEYS

May 29, 1956 R. J. STAHL ET AL 2,748,188

COLOR TELEVISION SYNCHRONIZING APPARATUS

Filed Sept. 11, 1950 6 Sheets-Sheet 4

CAMERA TRACKING SIGNAL &
COLOR PHASE SIGNAL
(TRANSMITTED NEAR END OF
VERTICAL BLANKING)

378 K.C. SELECTOR
DRIVE TO CAMERA

INVENTORS
ROBERT J. STAHL &
NORMAN L. HEIKES
BY
Lippincott & Smith
ATTORNEYS

INVENTORS
ROBERT J. STAHL &
NORMAN L. HEIKES
BY
Lippincott + Smith
ATTORNEYS

COLOR TELEVISION SYNCHRONIZING APPARATUS

Filed Sept. 11, 1950 6 Sheets-Sheet 6

INVENTORS
ROBERT J. STAHL &
NORMAN L. HEIKES
BY
Lippincott & Smith
ATTORNEYS

United States Patent Office 2,748,188

Patented May 29, 1956

2,748,188

COLOR TELEVISION SYNCHRONIZING APPARATUS

Robert J. Stahl, Redwood City, and Norman L. Heikes, San Francisco, Calif., assignors to Color Television Incorporated, San Francisco, Calif., a corporation of California Application September 11, 1950, Serial No. 184,187

19 Claims. (Cl. 178—5.4)

This invention relates to color television apparatus and is particularly concerned with apparatus provided for producing synchronizing control signals for stabilizing color television receiver operations.

In the art, proposals have already been made for the direct viewing of color television images by means of tricolor tubes, such as those represented, illustratively, by U. S. Patent No. 2,480,848, granted September 6, 1949, to Charles Willard Geer, and also U. S. Patent No. 2,481,839, granted September 13, 1949, to Alfred N. Goldsmith for a similar type of direct-view color tube. Also, there has been demonstrated a form of direct-view color tube wherein one or a plurality of scanning cathode-ray beams are arranged to pass through the apertures of a mask positioned closely adjacent a target area formed into a multiplicity of luminescent surfaces adapted to produce light in a plurality of primary or component colors of a polychrome or tricolor operation. In connection with apparatus of each of these types, the scanning beams are modulated under the control of incoming signals to produce the intensity changes of the color images resulting from beam impact.

The present invention has as one of its main purposes that of providing ways and means by which receiver operations for producing color television images by apparatus of the foregoing type or of still other types may be appropriately synchronized and phased with respect to transmitter operations.

In a concurrently filed application for United States Letters Patent entitled "Color Television Apparatus" we have shown apparatus whereby a signal suitable for actuating picture tubes of this character can be developed by scanning a single image produced by projecting upon the photo-sensitive surface of a camera tube a single optical image of the scene to be televised. This image is projected through a color filter which divides it into parallel strips each illuminated by one only of the three primary or component colors present (in a three color system) in the scene to be televised. In the preferred form of the said invention these strips extend vertically across the image field and are so dimensioned as to divide each line of the picture, as it is scanned in the manner now standardized for television transmission, into segments representing successively those three colors in a repetitive cycle. Further, it can be shown that the signals produced by scanning in this manner, insofar as they relate to the color information transmitted as such (disregarding information as to detail in the picture) do not contain the third harmonic of the color repetition frequency or integral multiples of the third harmonic. In general, the video waveform due to color is essentially a rectangular waveform (within the limits imposed by the bandwidth of the video channel) and its harmonic components may readily be determined.

Fourier analysis of an asymmetrical rectangular waveform yields the following relationship for the amplitude of its harmonics:

$$C_n = 2A_{av}\left[\frac{\sin\frac{n\pi d}{t}}{\frac{n\pi d}{t}}\right]$$

where $C_n$ is the amplitude of the $n$th harmonic, $A_{av}$ is the average amplitude of the fundamental, and $$\frac{d}{t}$$

is the duty cycle of the fundamental. From this relationship it will be seen that an harmonic whose order is equal to or an integral multiple of the reciprocal of the duty cycle will be absent. Accordingly, for a tricolor system the third, sixth, ninth, twelfth and so on harmonics will be absent, and it may be considered that these harmonics are products of the number of primary or component colors in which the polychrome or multicolo ranalysis is made, the color repetition frequency and some integer, such as one, two, three, four and so on. For a bicolor system, similarly, the second, fourth, sixth and so on (that is, all even) harmonics would be missing. Likewise, for a four-color system the fourth, eighth, twelfth and so on harmonics would be missing. It can further be shown that transmission of the fundamental and second and fourth harmonics of the color repetition frequency is adequate to convey the necessary color information. Finally it can be shown that if the highest harmonic contained in the signal and transmissible by the system lies close to the upper cutoff frequency there will be minimum carry-over of information as to one color into the interval allotted to the succeeding color and hence minimum color dilution and minimum color dilution and minimum "structure" in the reproduced picture.

Accordingly, in this preferred method, the color repetition frequency is chosen as very close to one megacycle per second so that the fourth harmonic falls very close to the upper limit of the fourth megacycle video band to which television transmissions are now limited. Under these circumstances there is no third harmonic of the color repetition frequency in the color information transmitted.

It has also been shown, in an article by Pierre Mertz and Frank Gray, published in "The Bell System Technical Journal" for July 1934, that a constant amplitude wave imposed upon a television signal, in such manner as to appear in opposite phase in successive scannings of any particular line of the television image, is invisible in such image as reproduced. Mertz and Gray produced this effect by using, for such constant frequency wave, an odd harmonic of half the line repetition frequency; the same effect can, however, also be produced by using a harmonic of the line frequency, provided the phase is reversed between the successive scannings of each line. Accordingly, in the apparatus described in the concurrently filed application mentioned, it is brought out that a three megacycle wave, being the third harmonic of the color repetition frequency and having a period equal to the length of the individual color segments of the transmission, may be used for synchronizing purposes. One of the objects of the present invention, therefore, is to develop a wave of this character which is reversed in phase at the appropriate intervals in such fashion that the reversals will be accurately followed by synchronizing apparatus in a color receiver but will be invisible either in color or in black-and-white reproductions of the picture transmitted.

In any color television system it is desirable that receiving equipment should be automatically phased as to color so that the pictures transmitted will be reproduced in their proper hues without the necessity of manipulation at the receiver. To this end it is necessary that color phase information also be transmitted in such form that there is no ambiguity as to the colors involved. In order to produce the most satisfactory color pictures it is desirable that each element of the picture field be depicted in all of the primary colors employed. This requires that the relative phase of the color transmission be varied from field to field, and this involves a rotation of the phase angle in the color phasing signal which is one-third the phase angle rotation of the synchronizing signal. Another object of the present invention is therefore to develop such phasing and synchronizing signals in their proper relationship and to combine them with the composite video and synchronizing signals which are necessary to black-and-white transmissions as well as those in color.

There is also required for the equipment described in the concurrently filed application mentioned, a control signal by means of which the scanning of the television camera image be accurately timed, so that the signal representative of each color occurs at precisely the proper epoch of the color repetition cycle and that this be tied in with the synchronizing signals. Another object of the present invention is to develop these control signals and, after they have accomplished their purpose, remove them from the signals actually transmitted so that they do not introduce spurious effects into the picture as received.

A further object of the invention is to provide apparatus which will supplement the "sync signal generator" as employed in black-and-white television equipment, requiring only minor modifications of the latter, tying in the frequencies required for the transmission of color information with those required for black and white to produce signals which, while containing the color information, can be reproduced on black-and-white receivers in a fully compatible manner so that they may be received by those having only monochrome receiving equipment substantially as well as those primarily intended for polychrome reproduction.

Still another object of the invention is to provide apparatus which, while primarily devised for use under the presently adopted "Standards of Good Engineering Practice Concerning Television Broadcast Transmissions," as promulgated by the Federal Communications Commission, is capable of being modified to conform with other standards without departure from the principles employed. In this connection the invention as particularly described herein is designed to operate upon the basis of a 525-line picture transmitted at the rate of 60 fields per second, with the lines interlaced at a 2:1 ratio; still another object of the invention is to provide equipment for generating the signals for synchronizing and phasing the color portion of receiving equipment without modifying the forms of the blanking, vertical synchronizing, horizontal synchronizing, or equalizing pulses now required, in any manner which will affect the operation of apparatus currently in use.

Broadly, therefore, the purpose of the present invention is to provide means for generating all of the signals specifically required for the transmission of color pictures, in accordance with the system generally described in the concurrently filed application of the present inventors, in such manner that they will maintain proper operation of the receiving equipment and will, at the same time, permit the reception of the same signals on black-and-white receivers in a manner substantially indistinguishable from signals primarily adopted to such monochrome reception.

While various modifications of the invention are possible, one form of apparatus usable to attain the objectives is set forth by the accompanying drawings. The representation is made largely by block diagram, inasmuch as the individual subassemblies themselves are known and the results achieved flow from the combination of these components one with another.

In the accompanying drawings reference to which will be made in the detailed description to follow:

Figure 3A:
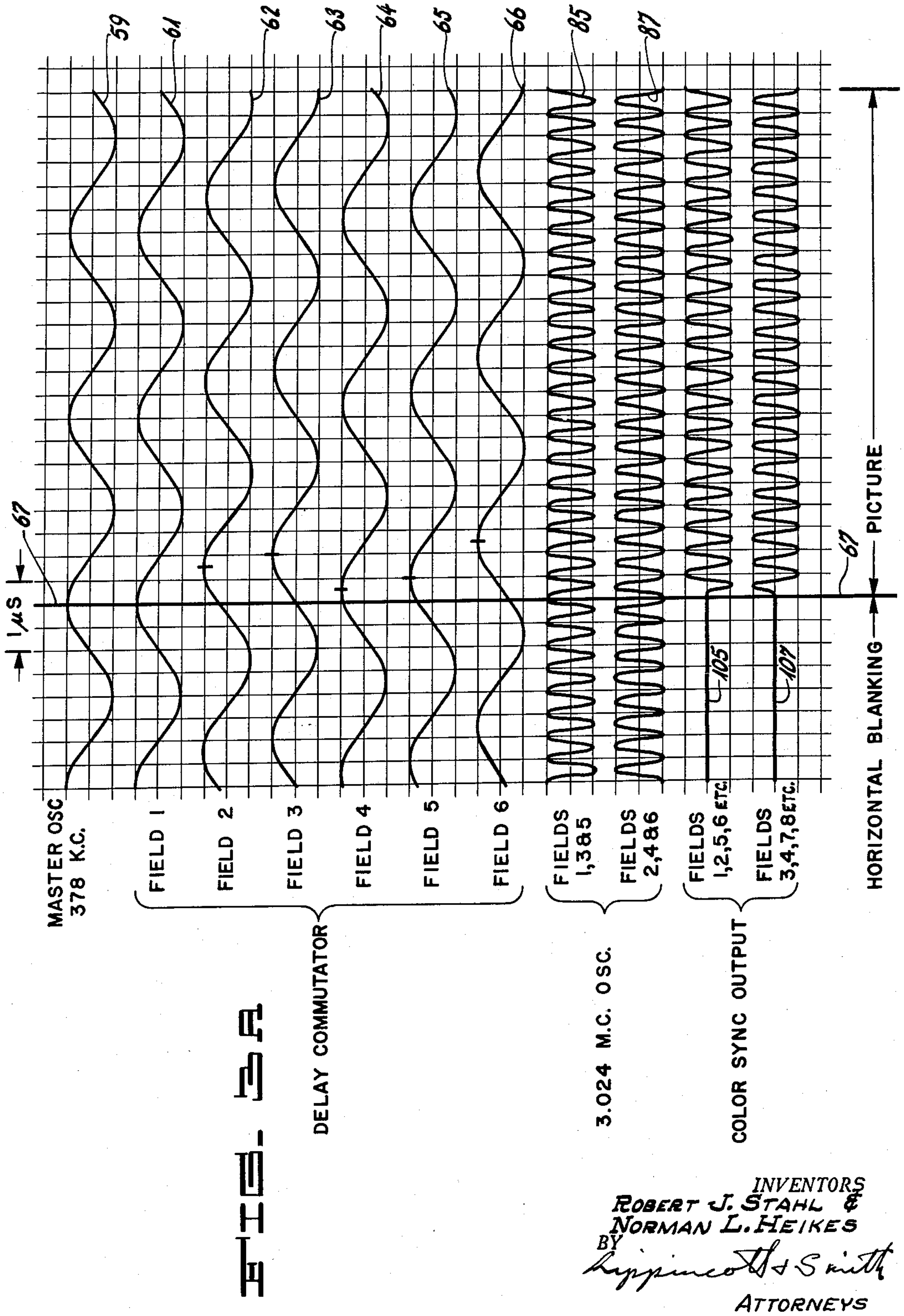
Figure 5B:
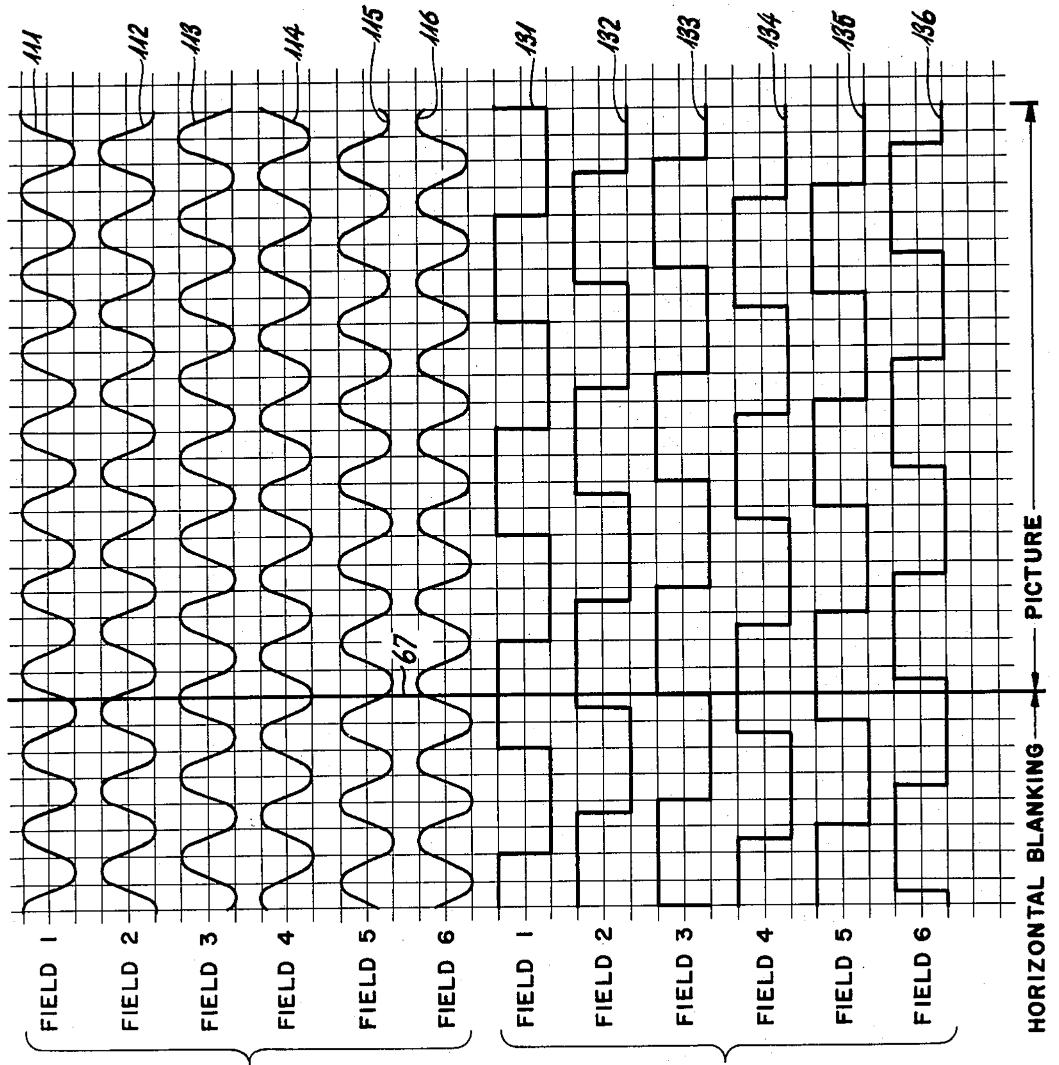
Figure 4:
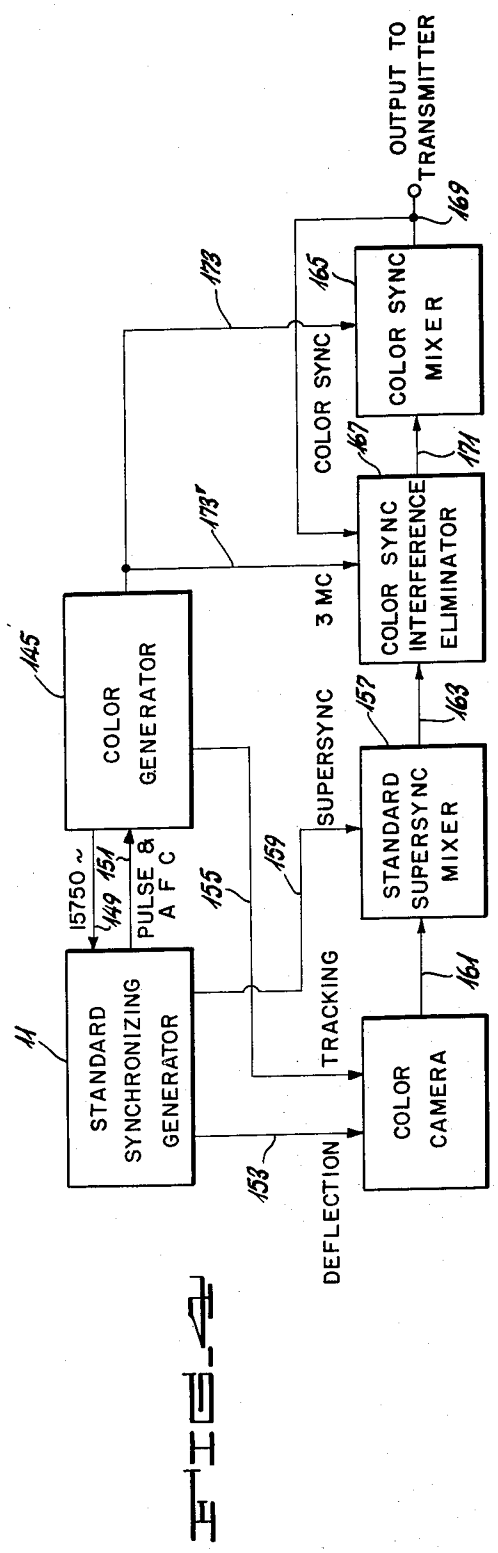
Figure 5:
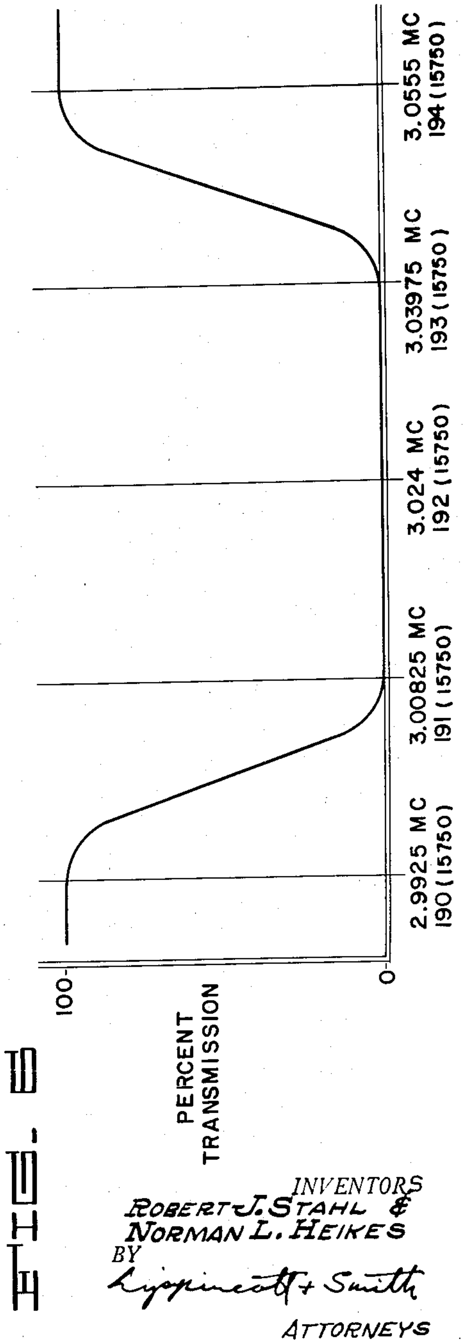
Figure 5:
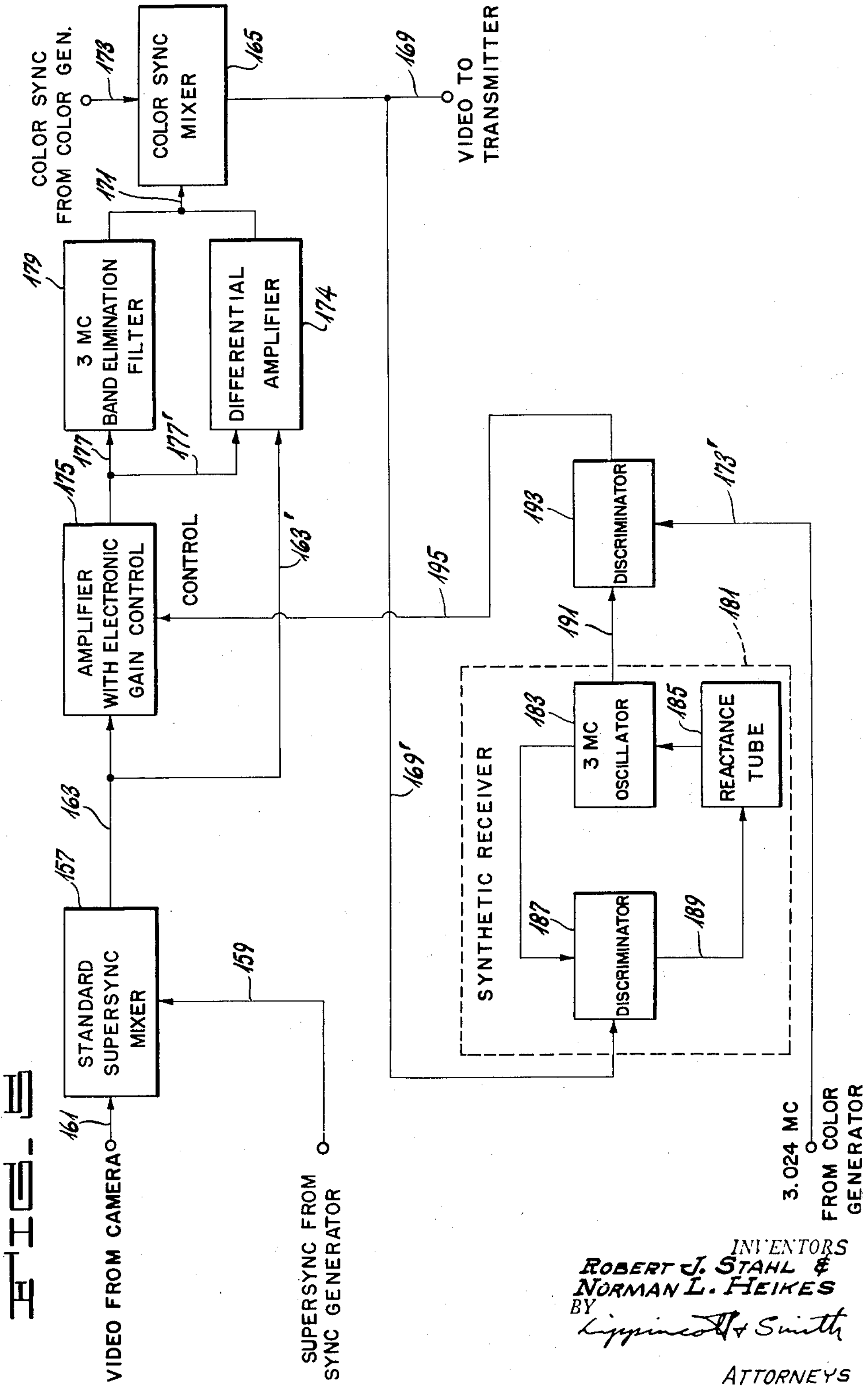

Figs. 3A and 3B comprise a series of graphs depicting the forms and relative phases of waves developed by the generator of this invention as they occur just prior to and immediately following the end of the horizontal blanking pulse at the beginning of the first line of each field scanned;

Fig. 4 is a block diagram showing the relationship of the color generator of this invention to the camera and studio equipment such as is also used in ordinary black-and-white transmissions;

Fig. 5 is a block diagram of a synchronizing interference eliminator for use with the system herein described; and Fig. 6 is a curve showing the characteristics of a band-elimination filter.

Making reference to the drawings, a conventional form of sync signal generator is represented at 11. This sync signal generator may be of the type customarily used and adopted in conjunction with television field equipment of the type customarily made and sold by Radio Corporation of America under the designation "Field Camera Equipment TK 30," and described in the instruction book entitled "Television Field Pick-Up Equipment," bearing the number IB 36014, and manufactured and published by Radio Corporation of America Engineering Products Department, Camden, New Jersey, U. S. A. The synchronizing signal generator is shown particularly in that portion of the aforesaid book commencing at page 51 and continuing through to page 78, and by the drawing used therewith, although it is to be understood that reference to the complete description is incorporated herein for descriptive purposes only. Other equipment of like character but differing in detail, is obtainable from other manufacturers, but where intended for use in the United States it will in any case supply the same waveforms at the same frequencies. Abroad other standards are used, but this invention may be adapted to such other standards by mere change of dimensions from those here given.

In accordance with the present invention the standard sync generator supplies all of these sync pulses in the same manner, phase, and amplitude as they are used in ordinary black-and-white transmission. In stabilizing the frequencies of the pulses it supplies use may be made of an oscillating crystal; customarily, however, provision is made for tying in the standard sync generator with the local source of alternating power, in order to minimize the effects of currents or potentials induced in receiver circuits from such power sources. Either type of operation may be used in connection with the apparatus of the present invention.

In addition, the pulses of certain frequencies supplied by the standard sync generator are utilized to develop or to control the frequencies developed by the color sync-generator of this invention. These various frequencies so used will not be enumerated here, but will be referred to from time to time in the course of the explanation which follows.

In the color television apparatus described by the inventors in their concurrently-filed application above mentioned, the television image is analyzed into its various image elements and in accordance with its various color components by means of a camera tube of the same type as is customarily used for black-and-white transmissions.

An image of the picture field to be transmitted is projected upon the sensitive surface of such a tube in much the usual fashion, except that there is interposed, in the plane of one image formed by the optical system of the television camera, an optical filter formed of areas of each of the primary colors used in the recreation of the color image, which divides the image as cast upon the sensitive surface of the tube into corresponding areas, each of which is illuminated by the light of one only of the three primary colors used. Experience with color processes of various kinds has led to the almost universal choice for such purposes of red, blue and green as the three primary colors. In the form of the invention there disclosed and to which the present invention is particularly adapted, the color areas of the filter are in the form of strips extending across the image field vertically; i. e., in a direction substantially perpendicular to the scanning lines into which the image is analyzed. The width of these strips of each color is so chosen that at the normal rate of line scanning, i. e., 15,750 cycles per second, each series of three strips comprising the color image will be traversed by the scanning beam in approximately one microsecond, making the repetition rate for each primary color very nearly one megacycle per second. The frequency actually chosen for illustration is 1.008 megacycles, this being the 64th harmonic of the line-scanning rate. For convenience this frequency of 1.008 megacycles will sometimes be referred to herein as a "one megacycle frequency" or "the one megacycle wave." It will be seen that this frequency is divided into three equal epochs by the three different colors used.

Superimposed upon the picture image, in the plane of the image filter, is an image of a tracking grid which may best be thought of as composed of strips of equal width and of like direction to the filter strips. The colors of the tracking strips are, in general, different from those of the filter strips and are arranged in different order. In the general case they include not only strips of the three primary colors used in the filter grid but also the secondary colors complementary to the primaries and each composed, additively, of the two other primary colors. Strips of white, containing all colors, and of black, containing none, may also be used in forming the tracking grid.

The tracking grid image is superimposed upon the filter, with the strips of varying colors substantially in register in a predetermined order, so that the image filter passes and stops the light from the various strips of the tracking grid in successive strips of light and shade. Owing to the filter design, however, a misregistration of not more than the width of one strip will not alter the pattern produced. The strips of light and shade are arranged to fall, when considered along the line of scan, in a repetitive sequence having a frequency which is different from the one megacycle color repetition frequency of the image filter. Disregarding the color of these bands of light and shade they are arranged in groups of relatively wide and narrower bands, the patterns of successive groups being similar but with the light and shade areas reversed in alternate groups with respect to the preceding and succeeding groups. The length of each group is made greater than that of one color cycle but not an integral multiple thereof. Accordingly, the position of any one color in the image filter will sometimes be represented as a strip of light and sometimes as a strip of shade. Furthermore, all three of the primary colors are represented in the pattern and in bands, or groups of strips, of unequal width. As a result the light and shade pattern forms a code which will substantially never be duplicated by any components naturally present in the picture. Finally, the groups, or even fractions thereof, are so arranged that when the waveforms developed in scanning them are alternately reverseed the result is a waveform having a dominant component of the one megacycle picture frequency. In the preferred embodiment of the invention which will here be described particularly the reversals are designed to take place once every one and one-third color cycles scanned, i. e., a reversal takes place after the scanning of every fourth strip of the image scanned, whether this strip be represented by light or shade; hence this pattern is referred to as a "four-thirds" pattern, but five-thirds, seven-thirds, and other patterns not including an integral number of color cycles may be developed by use of the principles described therein.

In the apparatus of the co-pending invention a signal produced by scanning the coded filter-tracking pattern image is passed through a one megacycle band-pass filter to produce a practically pure sine wave of the one megacycle color repetition frequency. This wave is compared in a discriminator with a comparison wave of the exact color repetition frequency desired and if the actual rate of scan is such as to produce a different frequency an error signal is developed which corrects the rate of scan.

Furthermore, in the scanning of successive fields, the position of the variously-colored filter strips is arranged with respect to the image to be transmitted, so that, after a succession of six fields, all portions of the image, comprising both the odd-numbered lines produced in the first scanning and the even-numbered lines produced in the alternate scanning, have been scanned in each color. This requires a change of phase in the color phasing signal and in the synchronizing wave which is also added to the transmitted video signal for producing the proper colors at the receiver.

The function of the apparatus of the present invention is to supply all of the waves mentioned above, which are not produced by the standard synchronizing generator, in correct phase and amplitude. The instrumentalities used to accomplish this will next be discussed.

The ultimate control of the frequencies developed by the device of this invention lies in the local source of power supply or a crystal oscillator, as the case may be. Immediate control of these frequencies, however, is derived from a master oscillator 13 operating at 378 kilocycles. This frequency is stabilized with that of the standard sync generator by being fed to a scale-of-12 frequency divider 15, this resulting in the 31,500-cycle equalizing pulse frequency normally developed by the standard sync generator 11. In the latter the 31,500-cycle frequency is stepped down by repeated divisions to 60 cycles in the usual manner, and is discriminated against the nominally 60 cycle power supply frequency. Any variation between the two develops an error signal which passes through the line 17 to an automatic frequency control of known type, included in the master oscillator, which brings it back into step with the desired frequency.

From the master oscillator 13 the main output is delivered to a delay commutator 19, the function of which is to supply the 378 kilocycle frequency in various phases as a control of the phase of the comparison frequency fed to the camera and of the synchronizing and phasing signals transmitted. The coded tracking signal produced by the latter is so devised that the pulses produced by one particular color of the cycle, red, for example, always appear in one phase, while the signals produced by the other two always appear 120° out of phase with respect to the comparison signal. Since the latter is an even harmonic of the line frequency and since each element of the picture is to appear in all colors, it follows that each color must occupy in turn at least three different positions in the field and hence that there must be at least three shifts of phase of the comparison signal in order to accomplish this. A pattern which is visually better than that produced by three shifts, each of a full third of the color repetition cycle, is obtained by doubling this number of shifts, the phase change being alternately one-sixth and one-half of a color cycle. Furthermore, the synchronizing signal of approximately three megacycles (actually 3.024 megacycles) must concurrently be shifted in phase by a proportionate amount, or by ½ and 1½ cycles alternately, the effective result being a reversal of phase at each shift. These shifts are accomplished by shifting the phase of the 378 kilocycle master oscillator through an angle of one-eighth of the phase shift required of the "three megacycle" wave.

Figure 2:
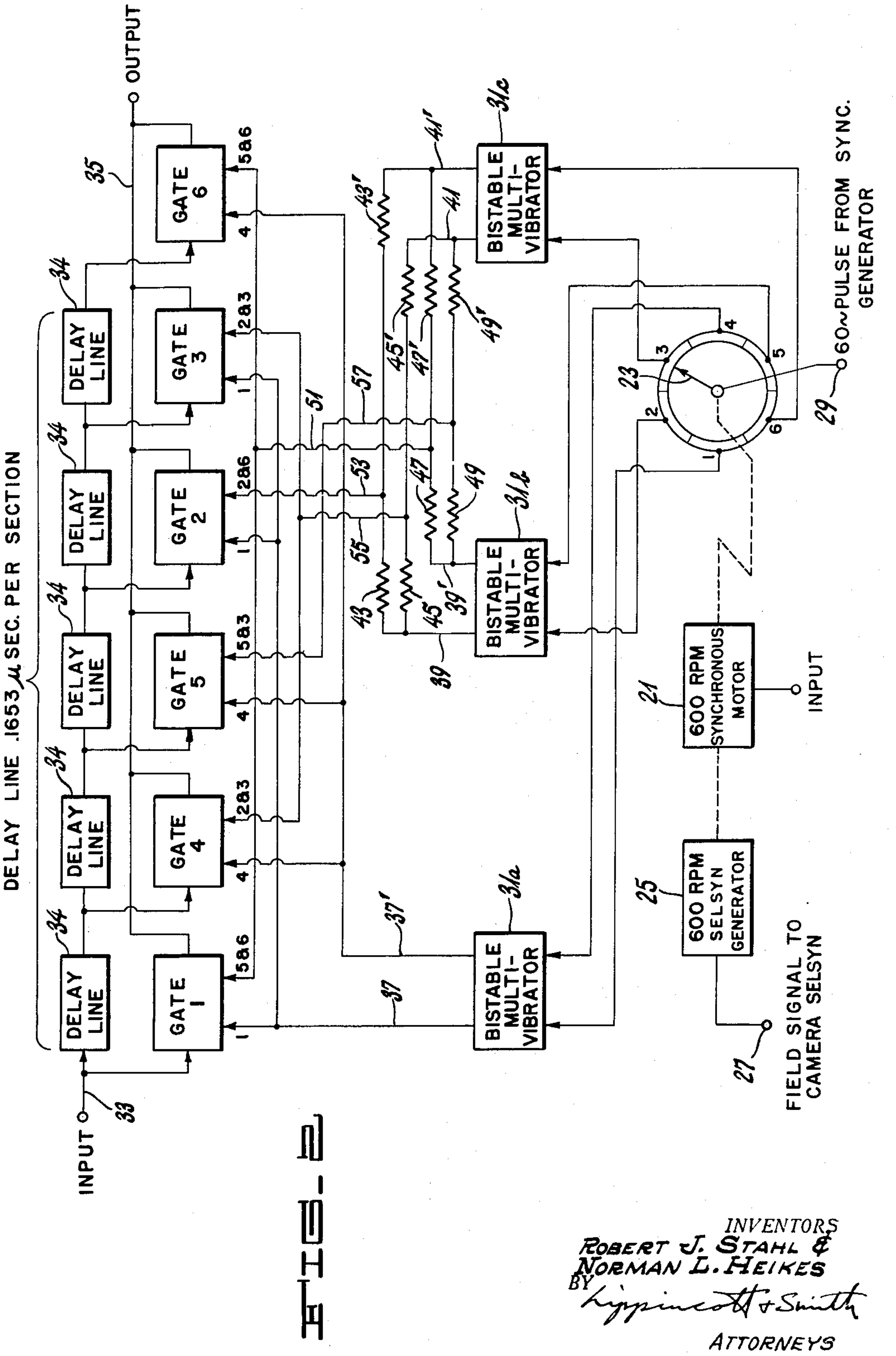
Fig. 2 is a more detailed block diagram of a delay commutator symbolized in Fig. 1 as a single block.

Within the delay commutator, as is shown in Fig. 2, is a 600 R. P. M. synchronous motor 21 which may be driven from the power line supplying the standard sync generator, if synchronous operation is used, or by an amplifier controlled by the 60-cycle field pulses from the standard sync generator if crystal control is employed. The synchronous motor 21 drives a 600 R. P. M. selsyn generator 25, the output of the latter being connected to a terminal 27 to which the camera filter selsyn drives may be connected to maintain the filters in synchronism with the color generator. The motor 21 also serves to time a commutator. This may be an electronic switch, but it is shown as a mechanical commutator 23 of six segments, numbered from 1 to 6 in the drawings. If the mechanical variety is used it may be an actual contact type or a capacity type as desired.

The commutator 23 is fed, through the line 29, with 60-cycle pulses from the standard sync generator 11, distributing these pulses successively to the various commutator segments. These segments are connected to a group of three bi-stable multivibrators 31*a*, 31*b*, and 31*c*. Multivibrator 31*a* is connected to be triggered, in one direction or the other, alternately, by pulses supplied from the first and fourth segments of the commutator 23; multivibrator 31*b* to be triggered by pulses from the second and fifth sections, while multivibrator 31*c* is triggered by pulses from segments three and six. The outputs of the three multivibrators are essentially square pulses supplied in opposite phase to their two output leads and reversing in polarity each time the multivibrator is tripped. These output pulses are arranged to open and close a series of six gating circuits of known type designated as gate 1 to gate 6 inclusive in Fig. 2, one gate at a time being opened. These gates control the output from various taps of a delay line of five sections, each designated by the reference character 34, which is fed from master oscillator 13 through lead 33. The gate outputs are fed, in parallel, to an output lead 35, only the pulse from that tap on the delay line whose gate is open reaching this output lead. Each section of the delay line provides a delay of 0.168 microsecond. This delay is equivalent to one-half cycle of the three-megacycle synchronizing wave or one-sixth cycle of the comparison wave fed to the camera. The minimum delay of approximately one-sixth microsecond is the time required to scan one-half of the width of one strip of the camera image filter. Considered in terms of these one-sixth microsecond units, gate 1 provides a zero delay, gate 2 a delay of three units, gate 3 of four units, gate 4 one unit, gate 5 two units and gate 6 five units. The operation of these gates is determined through the joint action of the three multivibrators acting through interpolating circuits of a well-known type.

The gates, gate 1 to gate 6 inclusive, are of coincidence type, of which a number are known. In general such gates comprise multi-electrode thermionic tubes, wherein the signal to be gated is usually applied to the control grid although it may be imposed on other of the electrodes. The potentials of these other electrodes are so proportioned that the signal will only be passed when the potentials applied to the various electrodes bear certain definite relationships, or, at least, fall within certain definite ranges. In the present instance it is assumed that the gates are so arranged that all of the signals applied from the multivibrators must be in the positive direction. This is purely illustrative, however. The only real necessity is that the combined signals supplied to any one gate from multivibrators 31*b* and 31*c* be in the same direction in order that the gate open; otherwise the gates may be arranged to accept practically any combination of signals for opening or closing purposes.

In the case of multivibrator 31*a* it is assumed that a pulse from segment 1 of the commutator 23 imposes a positive potential on the left-hand output lead 37, while a pulse from the commutator segment 4 puts a relatively negative potential upon this latter lead and transfers the positive potential to lead 37'. Similarly the pulse on segment 2 of the commutator makes output lead 39 of multivibrator 31*b* positive and 39' negative while the pulse on commutator segment 5 reverses this situation. Under like considerations the pulse on commutator section 3 puts a positive potential on lead 41 and a negative potential on lead 41', which potentials are reversed by a pulse on commutator segment 6.

A group of voltage dividers bridge between the various output leads of multivibrators 31*b* and 31*c* in their various possible permutations. Thus a divider comprising resistors 43 and 43' connects between lead 39 and lead 41', a divider comprising resistors 45 and 45' is bridged between lead 39 and lead 41, one comprising resistors 47 and 47' bridges leads 39' and 41' while a final voltage divider, comprising resistors 49 and 49' bridges leads 39' and 41. A connection is taken off from the midpoint of each of these voltage dividers, and it will be seen that three different values of potential may be imposed on each of these midconnections; "negative" if both of the leads bridged by the divider are negative, "zero" if one is negative and the other positive, and "positive" if both leads are positive. Only in the latter circumstance can the gate to which the specific potential divider path is connected be open, and this can occur only if that gate is connected simultaneously to a positive lead from multivibrator 31*a*. Thus gates 1, 2 and 3 can open only if lead 37 is positive. For gate 1 to open lead 51, connecting between resistors 47 and 47' must also be positive. For gate 2 to open lead 53, connecting between resistors 43 and 43' must be positive, while for gate 3 to be open lead 55, connecting between resistors 45 and 45' must be in the "positive" state. For gates 4, 5 or 6 to open lead 37' must be positive and leads 55, 57 and 51 respectively also positive. It will thus be seen that the gates open, in the order in which they are numbered, for intervals of $\frac{1}{60}$ of a second each, i. e., for the period of one scanning field of the television picture. The master oscillator wave available on lead 33 is therefore delayed for different intervals, varying between zero and $\frac{5}{6}$ of a microsecond, as it appears on the output lead 35.

The effect of these changes of phase will be better understood by reference to the upper group of curves in Fig. 3*a*, which represent the waveforms as developed during the period immediately preceding and immediately following the termination of the line blanking pulse occurring on the first line scanned in each field. Curve 59 represents the waveform from the master oscillator as fed into the delay line from lead 33. The waveforms of like frequency but mutually differing phase immediately below show the effects on this waveform of its passage through varying lengths of delay line, curves 61 to 66 inclusive representing the phase of the output wave for fields 1 through 6 respectively. Vertical line 67, which extends through all of the waveforms illustrated by Figs. 3A and 3B, represents the end of the horizontal blanking period resulting from the blanking pulses developed by the standard sync generator 11. As the master oscillator operates at a harmonic of the line frequency the relative phase remains a constant throughout each field.

Output waves from lead 35 are used to control the frequency and phase of the various other potentials produced by the color sync generator. The frequencies are derived from an oscillator 71 of approximately three megacycles frequency (actually 3.024 megacycles), which is the third harmonic of the color repetition frequency and the eighth harmonic of the master oscillator frequency. This "three megacycle" frequency is fed through leads 73 and 75 to a scale-of-eight frequency divider 77 to produce a frequency which is substantially that of the master oscillator but which, since it is produced from a different source, may vary slightly therefrom. This approximate 378-kilocycle frequency is applied through a lead 79 to an automatic frequency control device 81 which discriminates it against the frequency of the master oscillator as applied to the automatic frequency control from lead 35. An error signal is thus developed which is delivered through lead 83 back to oscillator 71, where it serves to bias a reactance tube or equivalent device and serves to bring the oscillator into exact step with the proper harmonic of the master oscillator frequency as modified in phase by the delay commutator.

It is apparent that the phase of the master oscillator frequency, as applied to the automatic frequency control device 81, will be changed at the beginning of each field. This change will, however, be by relatively small amounts—the maximum change at the beginning of any one field being less than 180°. This amounts to a change of 2½ cycles in the approximately three-megacycle output of oscillator 71, which drifts under the action of the automatic frequency control voltage supplied through lead 83 through the proper number of cycles to come back into phase. The drift amounts alternately to 1½ cycles and ½ cycle at the beginning of each field up to the last of each series, at which time the maximum drift of 2½ cycles, back to the initial state, occurs. This takes place during the vertical blanking period which covers on the average, the time required to scan 18 lines of the picture field. The change in frequency during the drift period is therefore less than three-quarters of one per cent for the maximum 2½ cycle drift, and all elements of the system can follow a frequency change of this magnitude without difficulty.

The three-megacycle waves, which are to be used to provide color synchronization therefore appear in the output circuit 73 of osscillator 71 (after the drift has occurred) either in the phase shown in Fig. 3A in curve 85 in the odd-order fields or as shown in curve 87 in the even-order fields.

The waves as shown in one or the other of these two curves pass through a branch channel from lead 73 to a pair of gates 91 and 93. The signal is applied to gate 91 directly. To gate 93 it is passed through a phase inverter 95 of known type, usually constituting a vacuum tube of unity amplification factor, so that the signals fed to the two gates are essentially the same signal but in opposite phase. The gates are actuated by a multivibrator 97 which has a normal frequency of 15 cycles per second. This frequency is stabilized at its exact proper value by the injection of 60-cycle pulses derived from the standard sync generator 11 through lead 29.

The output from gates 91 or 93, whichever is open, is fed to another gate 99, also of the type generally described above. This gate is normally open, but is closed at the beginning of each line during the period of the horizontal blanking pulse supplied from the standard sync generator 11 through lead 101. The result is that the three megacycle color sync pulses are interrupted during horizontal blanking, but at other times appear in output lead 103, for application to the studio mixer where they are combined with the video signals, in the forms shown respectively in curves 105 and 107, in successive pairs of fields. It may be noted that it is immaterial in what phase the three-megacycle values appear in any specific field as long as the phase is reversed every two fields or 525 lines. Waveforms 105 and 107 may therefore be interchanged and no ambiguity will be introduced as long as reversal occurs every two fields.

Lead 73 from oscillator 71 also connects to a scale-of-three frequency divider 109 to produce the color repetition frequency of 1.008 megacycles. As this frequency is secured by division of waves supplied from oscillator 71, it also changes in phase between successive fields by the same percentage as the color sync frequency, although, because of its longer period, the actual change in phase-angle is not so great. The resulting phase relationships in successive fields are shown by the group of waveforms illustrated in Fig. 3B and numbered consecutively from 111, showing the phase of this wave in field 1, to 116, showing the phase in field 6. These "one megacycle" waves are supplied through a lead 117 to a terminal 118 for connection to the color camera as the comparison signal which maintains tracking, as is described in the concurrently-filled application which has been referred to above.

A branch lead from the line 117 also feeds the "one megacycle" signal to a normally closed gate 119. This gate is operated indirectly by a signal developed in the standard sync generator. Within the latter is generated a gating pulse which, at the beginning of each field, admits equalizing pulses, occurring at double line frequency, into the standard sync signal. The equalizing pulse gate closes at an interval corresponding to nine horizontal scanning lines after the start of vertical blanking, and the pulse developed by its closing is fed through a lead 121 to a delay-multivibrator 123. The latter is of the monostable type. When tripped it remains in the tripped state for an interval corresponding to about another six horizontal scanning lines (assuming an 18-line vertical blanking pulse) and then reverts to its stable state. When the latter occurs it generates a pulse which is fed into a gate multivibrator 125, also of the monostable type, which generates a gating pulse of three scanning lines' duration, and it is this latter pulse which is applied to the gate 119, opening it for the last three lines of the vertical blanking period. It may be noted here that these three line intervals are more than adequate and permit the phasing signal to restabilize before transmission. If desired, however, the delay-multivibrator 123 may be omitted and the phasing signal transmitted during its entire period of frequency drift, in which case the multivibrator 125 will be adjusted to deliver a gating pulse of substantially the full width of the blanking pulse. On the other hand the phasing signals may be reduced to a single line at the end of the blanking period if desired, as they are always in phase with the three megacycle color sync signals. The intervals of one megacycle waves passed by the gate are carried by lead 127 to the gate 99, already described, where they are mixed with the color sync waves and supplied to the output terminal 103.

As a result of the various gatings it will be seen that the three-megacycle color sync signal is supplied during the transmission of both video and synchronizing information with the exception of the periods of horizontal blanking. The color phasing information is supplied only during the last three lines of the vertical blanking pulse, but is is also interrupted by the intervals when the horizontal blanking pulses would occur were they not masked by the vertical blanking. Both the color synchronizing and the phasing signals ride on top of the signals simultaneously transmitted. The three-megacycle color sync signals are transmitted at a low level; approximately five per cent of the amplitude of the maximum video signals or about three percent of the total amplitude of the combined signals. The color phasing signals, however, are supplied at approximately equal amplitude to the synchronizing pulses, but since they are supplied in the "black" direction and ride on top of the blanking pulses they are what has been referred to as "blacker than black" and have no effect on the received signal. The color sync signals occur both in the black range and in the range of the visible modulation, but because of their phasing in the various lines and fields they have no effect upon the picture.

There remains to be described the generation of the selector wave which is used to invert, periodically, the coded tracking-pattern signal developed in the camera and thus convert it into a dominantly one-megacycle wave. This selector wave also requires that its phase be changed concurrently with the changes of phase of the color sync and color phasing signals. Furthermore, with the particular frequency chosen, its period is the same as that of the master oscillator 13. Accordingly it can be derived from the scale-of-eight frequency divider 77 which supplies the wave for comparison to the automatic frequency control 81. A separate output 128 from the scale-of-eight frequency divider 77 feeds a wave squarer 129. This may take various forms, but probably the simplest is merely an overloaded amplifier, driven so hard that it reaches saturation on the one hand or cutoff on the other in a very small fraction of the cycle of the waveform fed to it. The resultant waveforms, with their relative phases as applied through fields 1 to 6 in the cycle of operation of the system, are shown in idealized form in the lower section of Fig. 3B, and are identified by the reference characters 131 to 136 inclusive as they apply to fields 1 to 6 respectively. These waveforms are available at output terminal 137, to be fed to the camera apparatus described in the concurrently-filed application.

The final pulses to be supplied to the camera equipment are used to establish scanning control at the camera during the first portion of each line, since the amount of correction required in the ordinary horizontal scanning rate will ordinarily differ as between the beginning and end of each scanning line, the comparison frequency loses control during the flyback time, and there may be errors in the scanning pattern which, if uncorrected, would accumulate from line to line over the picture field. Control during the initial period of each line is therefore assumed by a memory capacitor which is gated in to the correcting circuit at the start of each line.

To accomplish this, line frequency driving pulses from the standard sync generator are fed through lead 139 to trigger a monostable multivibrator 141. The latter is adjusted to deliver a 6 microsecond keying pulse to terminal 142, and then return to its stable state until again triggered by the next line-frequency pulse.

Figure 1:
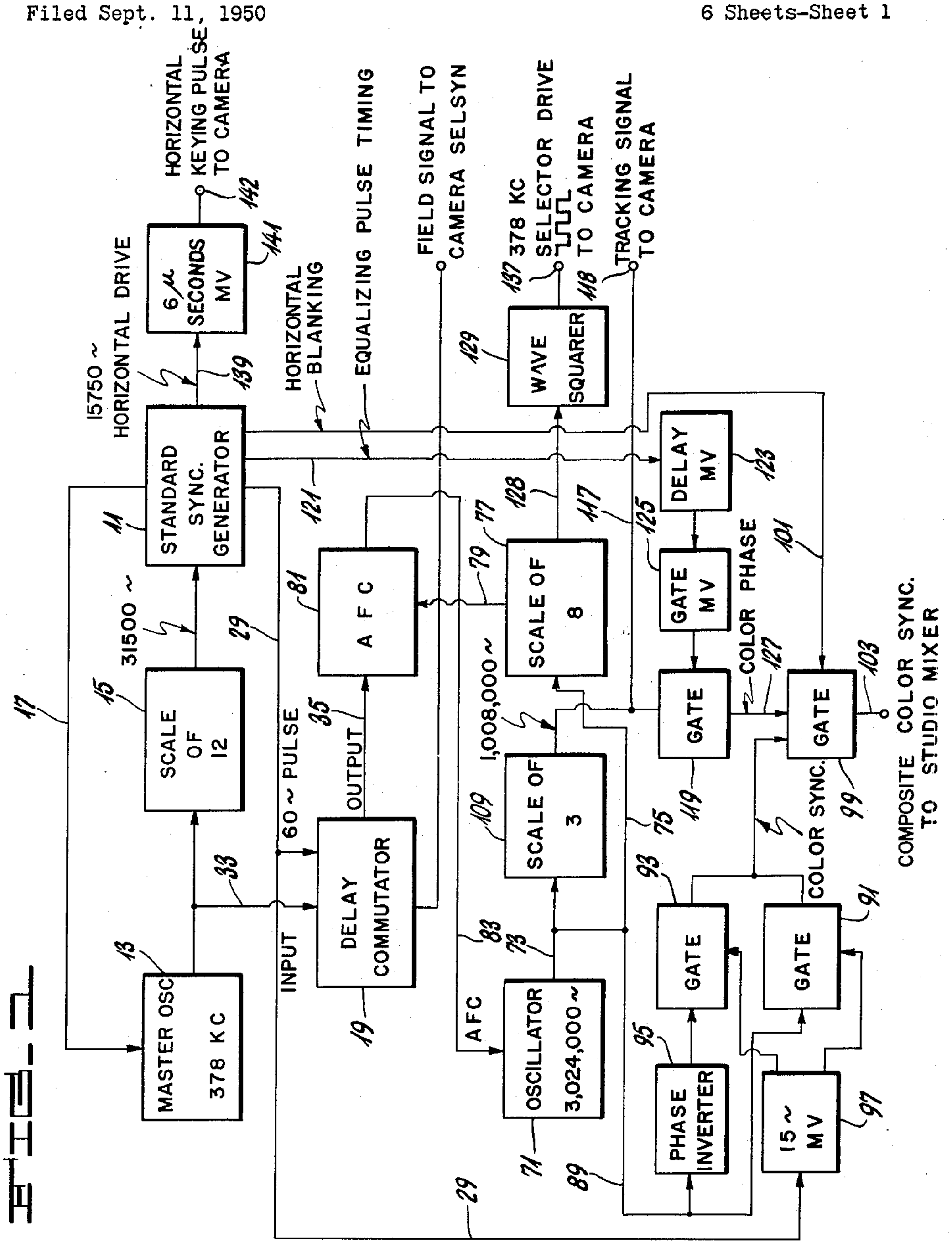
Fig. 1 is a block diagram of the color synchronizing generator of this invention.

Fig. 4 illustrates, in block form, the general organization of the entire equipment utilized to supply, to a radio transmitter or to a transmission line, the combined video, synchronizing, blanking and phasing signals. In this diagram, as in Fig. 1, the standard synchronizing generator is designated by the reference character 11. The color generator which has been described and is included in the diagram of Fig. 1 is indicated generally by the reference character 145. The tie lines 149 and 151 indicate the direction of the signals interchanged between the two generators mentioned, rather than their actual paths, these having been described in more detail already, the color generator feeding line-frequency signals to the standard synchronizing generator and receiving therefrom the various pulses that have been mentioned and the automatic frequency control voltage which ties the frequencies developed by both generators to the power supply frequency or crystal control as the case may be. The standard sync generator feeds the camera with the pulses which drive vertical and horizontal scanning generators through the path symbolically indicated at 153, in accordance with standard practice. Simultaneously, the color generator also feeds the camera with tracking control, in the form of the waveforms indicated in Fig. 3B through the symbolically-indicated path 155. The signals assumed to be supplied to the color camera through the path 155 also include the other outputs represented by Fig. 1 as being supplied to the camera, and thus may be considered to embody also the field signal supplied to the camera selsyn and the horizontal or line keying pulses.

The generator 11 feeds a standard type of "super sync" mixer 157 with the normal synchronizing and equalizing pulses by path 159. These pulses are combined with video signals from the color camera through the lead 161 and the combined video and synchronizing signals are passed on from the super sync mixer, through lead 163, either directly or through a color sync interference eliminator 167 to the color sync mixer 165 (essentially a simple adding circuit) from which the composite signal is delivered to output channel 169 for connection to the transmitter or line, as the case may be.

It has already been pointed out that the color sync signals are of a character which is not normally generated by the color information as such. It is possible, however, for picture detail to develop signals of approximately the three-megacycle frequency used for color synchronization in scanning the picture image, although such signals would contribute little to the image as finally seen on a receiver screen. The effect of such fortuitous three-megacycle signals would be to change the phase of the color sync signals, resulting in false colors for the periods when they were present, and while this occurs so rarely it is not believed to constitute a real problem, it is desirable to avoid any possibility of this type of interference occurring in systems which are intended to provide service of the highest grade.

The output of the super sync mixer in such cases is not fed directly to the color sync mixer but instead passes through channel 163 to a color sync interference eliminator 167. This is also supplied with the three-megacycle color synchronizing signal from the color generator 145 through channel 173', delivering the resultant signal with the interference effects eliminated to the color sync mixer and thence to output lead 169 for connection to the television radio transmitter. The signal waveform supplied from the color generator 145 through the channel 173 to the color sync mixer 165 comprises the three-megacycle sine wave appropriately controlled in phase, as already explained, which is present at all times except during horizontal or line blanking, and also the one-megacycle sinusoidal color phase signal which is present during the latter part of the vertical or field blanking period.

The organization of the color sync interference eliminator is shown in Fig. 5, wherein the standard super sync mixer, the color mixer, and the channels through which these elements are supplied are again shown and indicated by the same reference characters as have been referred to in connection with Fig. 4. The super sync mixer output, containing all video and synchronizing components except the one megacycle phasing signal and three megacycle sync signal, is fed through a channel 163 to a differential amplifier 174. The same signal is fed to a variable gain amplifier 175, having a gain of between zero and one depending upon a bias potential which may be applied to the tubes comprising it. The output of the amplifier 175 is divided, a portion of it passing through a channel 177 to a three-megacycle band elimination filter 179 which is designed with an attenuation characteristic such as is shown in somewhat idealized form in Fig. 6. In this curve the attenuation band is shown in terms of both megacycles per second and harmonics of the scanning-line frequency. The output of the variable gain amplifier is also fed through channel 177' to the differential amplifier 174 which latter amplifies the difference between the signal from the super sync mixer and that from the variable gain amplifier.

The apparatus is adjusted so that the normal gain of amplifier 175 is zero; accordingly its output is normally zero and hence the differential between the signals supplied by it and that supplied direct from the super sync mixer 157 through lead 163' is unity. The differential amplifier has less than unity gain by an amount equal to the attenuation of the signals which pass filter 179 and therefore the output signal supplied by it to the output channel 171 and the color sync mixer is that from the super sync mixer slightly attenuated. This signal is then combined with the three-megacycle color sync signal from lead 173 and passed to the output terminal 169.

The output signal from lead 169 is also fed through lead 169' to a device intended to duplicate the effect of three megacycle components accidentally introduced by picture content when such components are picked up by a television receiver. This equipment is that comprised within the dotted rectangle 181 and is, essentially, a flywheel oscillator of known type. The elements of this oscillator comprise an electronic oscillator 183, having a nominal frequency of three megacycles which may be varied in either direction by a reactance tube 185. The frequency developed by oscillator 183 is fed to a discriminator 187 where it is compared with any three megacycle component received by the discriminator through channel 169'. Normally the component so developed will be that of the color synchronizing signal and the oscillator 183 will therefore remain in proper phase with the latter, but if the three megacycle component changes in phase, owing to picture components, the error signal developed by the discriminator is passed through lead 189 to the reactance tube 185 and oscillator 183 assumes the new phase resultant from the three-megacycle picture content interference.

The output of oscillator 183 also passes through channel 191 to a second discriminator 193 where it is compared with the properly phased three-megacycle signal from the color generator through lead 173' and delivers any error signals which may be produced through lead 195 to vary the gain of amplifier 175, raising the gain of the latter, in the limit, to unity. Assuming the latter condition the signals fed to the differential amplifier directly and through the variable gain amplifier 175 are of equal amplitude, and, this being the case, its output becomes zero. The only signal then delivered to the output circuit 169 is then that which is passed through the band elimination filter 179, from which the three-megacycle component has been removed, leaving, as the three-megacycle component, practically the pure sync signal. As in all reverse feed-back arrangements a residual error remains, but by making the gain of the discriminator high (it may, of course, include amplifiers) the residual error may be reduced to any desired degree.

From the foregoing it will be appreciated that the synthetic receiver (Fig. 5) which receives its controlling signal by way of the lead 169' functions to sense the existence in any outgoing signals, available in the lead 169 to be fed to the transmitter, which are of such frequency, phase, amplitude and duration as to be capable of influencing in any way the response of a receiver device containing a similar or equivalent circuit. This is particularly true where such signals are capable of producing an effect at receiver points which would simulate a change in phase of the color synchronizing signal supplied to the color sync mixer from the color sync generator through the connection 173 relative to the color sequence in the video signal itself as available in the lead 161.

Although specific frequencies and phase relationships have been mentioned, and, in fact, emphasized in the preceding description, it is to be understood that such emphasis is predicated on the standards of television transmission which govern television broadcasting in the United States rather than on inherent limitations in the invention itself. A wider television frequency channel, a different field frequency, a different interlace pattern than the present 2:1 standard, a different number of lines per field or a different pattern of color distribution in the same field or in successive fields would probably change all of the frequencies specifically referred to and might, or might not, require changes in the phase relationship between the various waveforms developed. In all past practice of which we are aware every effort has been made to keep the phase of synchronizing signals as constant as possible with respect to some frequency norm. In some instances, as is the case of sync generators tied in with a local power supply system, this norm itself might vary slightly, but in such circumstances the variation is usually very small indeed and occurs at rates which, in comparison to the frequencies employed in television, are extremely slow. In accordance with this invention, however, phase variations are deliberately introduced for two purposes, first, to enable a favorable color distribution pattern to be used and second, to take advantage of the self-eliminating effects of phase inversion as between appearances of the same frequency in successive retracings of the same area on a television screen, as enunciated in the Mertz and Gray article, supra, although in our system these effects can be artificially induced instead of relying on harmonic relationships. In order to adapt this principle to the transmission of color pictures as is here set forth certain modifications are required if a desirable color pattern is to be maintained, this taking the form of the reversal of phase of the color sync signals as between odd order and even order fields which is here introduced. Other color patterns and other color synchronizing frequencies would almost certainly require phase changes of different magnitudes, quite probably occurring at different times. From the point of view of the broad invention what is important is not the magnitude or direction of these phase changes but the fact that they are produced and the manner of producing them. Of somewhat less importance but still of considerable moment is the fact that because the maximum phase change of the master oscillator frequency in any one step is always less than 180° the direction of the phase shift of the discriminator-controlled signal is determined, and hence minimum duty is imposed on the control circuit.

There is a very wide latitude of choice for the designing engineer in the component instrumentalities represented by the blocks in the various diagrams. It is taken for granted, of course, that amplification can be and will be introduced wherever necessary to bring the signals up to the levels needed if they are to perform the functions for which they are intended. Many types of oscillators, discriminators, filters, and the like are known. Multivibrators of monostable and bistable types are also many, and it may be mentioned here that there is no intention herein to limit the term "multivibrator" to those employing vacuum tubes, since magnetic amplifiers are also coming into use for this purpose and it may be expected that they will shortly be developed to operate at the frequencies here required. If so developed their substitution for the vacuum tube type would be an obvious step. Therefore, it is not considered that the invention is limited by the specific embodiment thereof which has been described herein but regard the latter as merely one illustration of the invention as defined in the claims which follow.

We claim:

1. A generator of synchronizing signals for color television systems comprising a frequency stabilized oscillator tuned to a harmonic of half line frequency to produce electrical waves of a sub-harmonic of the desired synchronizing frequency, means fed by said oscillator for producing from said waves a plurality of waves of said sub-harmonic frequency but mutually displaced phase, switching means for connecting said phase-displaced waves successively into a common output circuit, an oscillator tuned to approximately said synchronizing frequency and including means for varying its frequency of oscillation in response to a bias voltage applied thereto, a frequency divider connected to said synchronizing frequency oscillator for stepping the frequency supplied thereby down to said sub-harmonic frequency, a discriminator connected to said common output circuit and said frequency divider and operative to develop an error signal varying as a function of the phase difference of signals applied thereto, and circuit connections for applying such error signal to bias said frequency varying means in such sense as to cause a variation in frequency in opposite direction to the variation producing said error signal.

2. Apparatus in accordance with claim 1 wherein said means for producing sub-harmonic waves of mutually displaced phase comprises a delay line having a delay period differing from the period of said sub-harmonic frequency, said switching means being connected to supply said wave to said output circuit directly in one position through said delay line in a second position.

3. Apparatus in accordance with claim 1 wherein said means for producing sub-harmonic waves of mutually displaced phase comprises a delay line of a plurality of sections, and including connections from the ends of said sections to said switching means, said switching means being operative to deliver waves from one only of said connections to said output circuit at any one instant.

4. Apparatus in accordance with claim 3 wherein the total delay produced by all of the sections of said delay line is less than one half the period of said sub-harmonic frequency.

5. Apparatus in accordance with claim 1 wherein said switching means comprises a plurality of electronic gates, and including multivibrator means for providing actuating potentials for said gates and means for providing triggering potentials to said multivibrator means at regular intervals.

6. Apparatus in accordance with claim 1 wherein said switching means comprises a plurality of electronic gates of the coincidence type, and means for supplying actuating potentials to said gates comprising a plurality of bistable multivibrators, means for tripping each of said multivibrators in succession from one of its stable states to the other at regular intervals, and interpolating circuit connections between each of said multivibrators and all of said gates for applying coincident actuating potentials to one only of the latter at a time in a predetermined succession.

7. Apparatus in accordance with claim 6 for use in combination with a television synchronizing generator supplying pulses at a field repetition rate, wherein said multivibrator tripping means comprises a commutator having a plurality of segments respectively connected to said multivibrators in sequence, a synchronous motor rotating at a rate equal to said field repetition rate divided by the number of said segments mechanically connected to drive said commutator, and electrical connections from said television synchronizing generator to said commutator for supplying field repetition rate pulses therethrough to trip said multivibrators successively prior to the scanning of successive fields.

8. Apparatus in accordance with claim 1 for use in combination with a television synchronizing generator developing pulses at a field repetition rate and a television camera employing a moving optical filter varying in position at said field repetition rate, wherein said switching means comprises a commutator having a number of segments corresponding in number to the number of said phase displaced waves, a synchronous motor drive for said commutator, connections for supplying power to said motor in phase with said field repetition frequency, said motor being operative at a rotational speed equal to said field repetition frequency divided by the number of said commutator segments, connections from said television synchronizing generator to said commutator for supplying pulses thereto prior to the scanning of each field, pulse-responsive gating means connecting each of said phase-displaced waves to said common output circuit, connections from said commutator segments to said gating means, and a selsyn generator driven by said synchronous motor for supplying operating potentials for driving said camera filter at a predetermined speed and phase, with respect to the sequence of operation of said switching means.

9. In combination with a color television camera for developing video signal information indicative of color and a sync signal source for developing each of line and field blanking signals during which time line, field and equalizing sync signals are produced and which signals are combined with the developed video signal intelligence to provide a composite signal series, apparatus to produce color sync information comprising a generator for developing a continuous signal of substantially sinusoidal waveform and of a frequency corresponding to an harmonic of the color repetition frequency of the video signal which is a product of the number of primary or component colors of the multicolor analysis, the color repetition frequency and an integer, and means for mixing the said sinusoidal signals with the produced video signal information during periods of video signal production to provide a compound signal comprising video and color sync information for mixing with the output of the sync signal source.

10. In combination with a color television camera for developing video signal information indicative of color and a sync signal source for developing each of line and field blanking signals during which time line, field and equalizing sync signals are produced and which signals are combined with the developed video signal intelligence to provide a composite signal series, apparatus to produce color sync information comprising a generator for developing a continuous signal of substantially sinusoidal waveform and of a frequency corresponding to an harmonic of the color repetition frequency of the video signal which is a product of the number of primary or component colors of the multicolor analysis, the color repetition frequency and an integer, means for interrupting the produced signal during the line blanking periods, and means for mixing the said sinusoidal signals with the produced video signal information during periods of video signal production to provide a compound signal comprising video and color sync information for mixing with the output of the sync signal source.

11. In combination with a color television camera for developing video signal information indicative of color and a sync signal source for developing each of line and field blanking signals during which time line, field and equalizing sync signals are produced and which signals are combined with the developed video signal intelligence to provide a composite signal series, apparatus to produce color sync information comprising a generator for developing a continuous signal of substantially sinusoidal waveform and of a frequency corresponding to an harmonic of the color repetition frequency of the video signal which is a product of the number of primary or component colors of the multicolor analysis, the color repetition frequency and an integer, means for shifting the phase of the produced signal at regularly recurring periods, and means for mixing the said sinusoidal signals with the produced video signal information during periods of video signal production to provide a compound signal comprising video and color sync information for mixing with the output of the sync signal source.

12. In combination with a color television camera for developing video signal information indicative of color and a sync signal source for developing each of line and field blanking signals during which time line, field and equalizing sync signals are produced and which signals are combined with the developed video signal intelligence to provide a composite signal series, apparatus to produce color sync information comprising a generator for developing a continuous signal of substantially sinusoidal waveform and of a frequency corresponding to an harmonic of the color repetition frequency of the video signal which is a product of the number of primary or component colors of the multicolor analysis, the color repetition frequency and an integer, means for shifting the phase of the produced signal at regularly recurring periods, means for interrupting the produced signal during the line blanking periods, and means for mixing the said sinusoidal signals with the produced video signal information during periods of video signal production to provide a compound signal comprising video and color sync information for mixing with the output of the sync signal source.

13. In combination with a color television camera device for scanning an image area to develop video signal information indicative of color and a sync signal source for developing each of line and field blanking signals during which line, field and equalizing signals are produced to be combined with the developed video signals to provide a composite signal series, apparatus to produce color sync and phase information comprising a generator for developing a continuous signal of substantially sinusoidal waveform of a frequency corresponding to an harmonic of the color repetition frequency of the video signal which is a product of the number of primary or component colors of the polychrome analysis, the color repetition frequency and an integer, means for mixing the sinusoidal signals in phase controlled manner with the video signal information during periods of video signal production to provide a compound signal comprising both video and color sync information for mixing with the output of the sync signal source to form the composite signal series, means for developing a second signal also of sinusoidal waveform and of a frequency corresponding to the repetition of the video color cycle to provide a color phase indication and means to add the last-named sinusoidal waveform to the composite of the compound video signal and sync signal information, said added signal being provided only during a portion of the field blanking period.

14. In combination with a color television camera device for scanning an image area to develop video signal information indicative of color and a sync signal source for developing each of line and field blanking signals during which line, field and equalizing signals are produced to be combined with the developed video signals to provide a composite signal series, apparatus to produce color sync and phase information comprising a generator for developing a continuous signal of substantially sinusoidal waveform of a frequency corresponding to an harmonic of the color repetition frequency of the video signal which is a product of the number of primary or component colors of the polychrome analysis, the color repetition frequency and an integer, means for interrupting such signal during the line blanking periods, means for mixing the sinusoidal signals in phase controlled manner with the video signal information during periods of video signal production to provide a compound signal comprising both video and color sync information for mixing with the output of the sync signal source to form the composite signal series, means for developing a second signal also of sinusoidal waveform and of a frequency corresponding to the repetition of the video color cycle to provide a color phase indication and means to add the last-named sinusoidal waveform to the composite of the compound video signal and sync signal information, said added signal being provided only during a portion of the field blanking period.

15. In combination with a color television camera device for scanning an image area to develop video signal information indicative of color and a sync signal source for developing each of line and field blanking signals during which line, field and equalizing signals are produced to be combined with the developed video signals to provide a composite signal series, apparatus to produce color sync and phase information comprising a generator for developing a continuous signal of substantially sinusoidal waveform of a frequency corresponding to an harmonic of the color repetition frequency of the video signal which is a product of the number of primary or component colors of the polychrome analysis, the color repetition frequency and an integer, means for shifting the phase of the produced signal at regularly recurring periods coinciding with complete field scannings, means for mixing the sinusoidal signals in phase controlled manner with the video signal information during periods of video signal production to provide a compound signal comprising both video and color sync information for mixing with the output of the sync signal source to form the composite signal series, means for developing a second signal also of sinusoidal waveform and of a frequency corresponding to the repetition of the video color cycle to provide a color phase indication and means to add the last-named sinusoidal waveform to the composite of the compound video signal and sync signal information, said added signal being provided only during a portion of the field blanking period.

16. In combination with a color television camera device for scanning an image area to develop video signal information indicative of color and a sync signal source for developing each of line and field blanking signals during which line, field and equalizing signals are produced to be combined with the developed video signals to provide a composite signal series, apparatus to produce color sync and phase information comprising a generator for developing a continuous signal of substantially sinusoidal waveform of a frequency corresponding to an harmonic of the color repetition frequency of the video signal which is a product of the number of primary or component colors of the polychrome analysis, the color repetition frequency and an integer, means for shifting the phase of the produced signal at regularly recurring periods coinciding with complete field scannings, means for interrupting such signal during the line blanking periods, means for mixing the phase controlled sinusoidal signals with the video signal information during periods of video signal production to provide a compound signal comprising both video and color sync information for mixing with the output of the sync signal source to form the composite signal series, means for developing a second signal also of sinusoidal waveform and of a frequency corresponding to the repetition of the video color cycle to provide a color phase indication and means to add the last-named sinusoidal waveform to the composite of the compound video signal and sync signal information, said added signal being provided only during a portion of the field blanking period.

17. In combination with a color television camera device arranged to analyze an image along a series of linear paths which comprise a plurality of signal portions representing the image in each of its color components repeating in a selected color cycle to develop video signal information indicative of color and a sync signal generator for developing line and field blanking signals for combination with the resultant video signals to form a composite signal, and also for developing line, field and equalizing pulse sync signals during the blanking periods to be added to the composite signal to provide a combination of intelligence signals comprising video, blanking and synchronizing information, apparatus to produce color sync and phase information comprising an oscillator to generate continuously a signal of substantially sinusoidal waveform at a frequency generally corresponding to an harmonic of the color repetition frequency of the video signals which is a product of the number of primary or component colors of the polychrome analysis, the color repetition frequency and an integer; phase shifting means including delay lines from which different phase delays are selectable for shifting the phase of the generated signals; gating means to select different phase delays of the generated sinusoidal signals at selectively repeating and regularly recurring periods coinciding with complete field scannings, an interrupting circuit for interrupting the effect of the generated sinusoidal signals during line blanking periods, and a mixing circuit for combining the selected phase-controlled sinusoidal signals with the generated video signal information to provide a compound signal comprising concomitantly present video and color sync information for mixing with the output of the sync signal source to form the composite signal series.

18. In combination with a color television camera device arranged to analyze an image along a series of linear paths which comprise a plurality of signal portions representing the image in each of its color components repeating in a selected color cycle to develop video signal information indicative of color and a sync signal generator for developing line and field blanking signals for combination with the resultant video signals to form a composite signal, and also for developing line, field and equalizing pulse sync signals during the blanking periods to be added to the composite signal to provide a combination of intelligence signals comprising video, blanking and synchronizing information, apparatus to produce color sync and phase information comprising an oscillator to generate continuously a signal of substantially sinusoidal waveform at a frequency generally corresponding to an harmonic of the color repetition frequency of the video signals which is a product of the number of primary or component colors of the polychrome analysis, the color repetition frequency and an integer; phase shifting means including delay lines from which different phase delays are selectable for shifting the phase of the generated signals; gating means to select different phase delays of the generated sinusoidal signals at selectively repeating and regularly recurring periods coinciding with complete field scannings, an interrupting circuit for interrupting the effect of the generated sinusoidal signals during line blanking periods, a mixing circuit for combining the selected phase-controlled sinusoidal signals with the generated video signal information to provide a compound signal comprising concomitantly present video and color sync information for mixing with the output of the sync signal source to form the composite signal series, a second generator for developing a second signal waveform also of substantially sinusoidal waveform and of a frequency corresponding to the repetition of the video color cycle of scanning for providing a color phase indication; means to add the second-developed sinusoidal waveform to the composite of the video signal and all sync signal information; means for limiting the periods of addition of the second-named sinusoidal waveform to the composite signal to time periods coinciding with the latter portion of the field blanking period, and an output connection whereat the summation of all of the developed video, blanking, synchronizing and phasing signals are concurrently present.

19. In combination with a color television camera device for developing video signal information indicative of color and a sync signal source for developing each of line and field blanking signals during which time line, field and equalizing sync signals are produced and which signals are combined with the developed video signals to provide a composite signal series, apparatus to produce color sync and phasing information comprising a generator for developing a continuous signal of substantially sinusoidal waveform and of a frequency corresponding to an harmonic of the color repetition frequency of the video signal which is a product of the number of primary or component colors of the polychrome analysis, the color repetition frequency and an integer, which frequency is an harmonic of a fundamental frequency of such value that the fourth harmonic of the fundamental lies within the bandwidth over which video signals are transmitted and is the closest harmonic to the highest frequency within that bandwidth; means for shifting the phase of the produced signal at regularly recurring periods, means for interrupting the said signal during the line blanking periods, means for mixing the said signal with the video signal information during periods of video signal production to provide a compound signal comprising video and color sync information for mixing with the output of the sync signal source, means for developing a second signal also of sinusoidal waveform and of a frequency corresponding to the repetition of the color cycle to provide a color phase indication and means to combine the last-named sinusoidal waveform with the composite of the compound video signal and sync signal information during a portion of the field blanking period.

References Cited in the file of this patent

UNITED STATES PATENTS

| | | |
|---|---|---|
| 2,250,284 | Wendt | July 22, 1941 |
| 2,521,353 | Fitch et al. | Sept. 5, 1950 |
| 2,535,552 | Schroeder | Dec. 26, 1950 |
| 2,545,083 | Grosdorf | Mar. 13, 1951 |
| 2,548,829 | Sziklai | Apr. 10, 1951 |
| 2,551,308 | Adler | May 1, 1951 |
| 2,552,140 | Boothroyd et al. | May 8, 1951 |
| 2,627,549 | Kell | Feb. 3, 1953 |
| 2,636,937 | Fredendall et al. | Apr. 28, 1953 |